United States Patent [19]
Garafola et al.

[11] Patent Number: 5,473,596
[45] Date of Patent: Dec. 5, 1995

[54] METHOD AND SYSTEM FOR MONITORING TELECOMMUNICATION NETWORK ELEMENT ALARMS

[75] Inventors: Richard A. Garafola, Sparta, N.J.; Robert W. Rothlisberger, Crystal Lake; James R. Smith, Chicago, both of Ill.

[73] Assignee: AT&T Corp., Murray Hill, N.J.

[21] Appl. No.: 164,500

[22] Filed: Dec. 9, 1993

[51] Int. Cl.$^6$ .............................. H04J 3/14; H04L 12/26
[52] U.S. Cl. ........................ 370/13; 370/68.1; 370/110.1; 379/33
[58] Field of Search .............................. 370/13, 17, 68.1, 370/110.1; 379/1, 32, 33

[56] References Cited

U.S. PATENT DOCUMENTS

| 4,870,638 | 9/1989 | Kawano et al. | 370/17 |
| 5,049,873 | 9/1991 | Robins et al. | 379/33 |
| 5,063,564 | 11/1991 | Crandall et al. | 370/110.1 |
| 5,136,617 | 8/1992 | Stenard | 375/108 |
| 5,297,193 | 3/1994 | Bouix et al. | 379/32 |

OTHER PUBLICATIONS

*Engineering and Operations in the Bell System: Telecommunications in the Bell System in 1982–1983,* 2d edition, ed. by R. F. Rey, 1983, pp. 632–638.

Primary Examiner—Wellington Chin

[57] ABSTRACT

A method of monitoring DS-0 alarm signals generated by telecommunication network elements, where the network elements include multiple network processing circuits connected to DS-1 facilities. The method comprises the steps of collecting the DS-0 alarm signals; cross-referencing the network elements and the network processing circuits to the DS-1 facilities; correlating the DS-1 facilities to customer circuit identification information; and routing the DS-0 alarm signals to a user location. The method allows a user to view customer outages in real time and also permits proactive observation and analysis of developing problems.

24 Claims, 4 Drawing Sheets

METHOD AND SYSTEM FOR MONITORING TELECOMMUNICATION NETWORK ELEMENT ALARMS

FIELD OF THE INVENTION

The present invention relates generally to telecommunication systems. More particularly, the present invention relates to a method and system for monitoring alarms obtained from switching network elements.

BACKGROUND OF THE INVENTION

Telecommunication systems employ carriers that carry voice and data from one network element to another network element, such as a Digital Access and Cross-Connect System (DACS). DACS network elements are described generally in an article by R. P. Abbott and D. C. Koehler, "Digital Access and Cross-Connect System— System Architecture," NTC '81, *IEEE, National Telecommunication Conference*, vol. 1, pp. B.1.2.1–B.1.2.7 (1981). This article is incorporated by reference herein. The purpose of a DACS is to improve flexibility in routing channels by connecting the various carriers to one another via software. One such carrier is a T1.5 or T1 carrier. This carrier is a facility that carries a DS-1 or a level-one digital signal. More specifically, such a carrier carries twenty-four DS-0 channels each of which is a 4-kHz voice signal. One frame format samples the twenty-four DS-0 signals, converts them to a digital form and combines them into a frame. Twelve frames are then combined into a superframe. Finally, the twenty-four channels are multiplexed as one DS-1 signal on a T1.5 carrier. The T1.5 carrier, thus, terminates in a network element such as a DACS were the point of termination is a component known as a Network Processing Circuit (NPC).

Various systems are known in the art for DS-1 circuit and facility monitoring and performance. These systems include provisions for providing and detecting alarms when certain errors or malfunctions occur in a DS-1 circuit or facility. The alarms are then collected and analyzed. One such system is disclosed in U.S. Pat. No. 5,136,617, "Switching technique for attaining synchronization," which is incorporated by reference herein.

Currently, however, there exists no system for monitoring DS-0 circuit alarms, such as an alarm on an NPC in a DACS frame, in a format that is useful for a network management center (NMC). An NMC typically consists of personnel responsible for the surveillance and control of the flow of telecommunication network information in a specific geographical area or for a specific group of customers.

SUMMARY OF THE INVENTION

The present invention provides a method of monitoring a plurality of DS-0 alarm signals generated by a plurality of network elements, said plurality of network elements including a plurality of network processing circuits, said plurality of network processing circuits connected to a plurality of DS-1 facilities, said method comprising the steps of collecting said plurality of DS-0 alarm signals; cross-referencing said plurality of network elements and said plurality of network processing circuits to said plurality of DS-1 facilities; correlating said plurality of DS-1 facilities to customer circuit identification information; and routing information about said DS-0 alarm signals to at least one of a plurality of user locations.

As one feature of the present invention, alarm signals are processed in real time to permit immediate attention by maintenance personnel.

As another feature of the present invention, the system stores historical data to allow proactive observation and analysis of developing problems.

As yet another feature of the present invention, alarms are correlated to a specific network element frame and network processing circuit.

As a further feature of the present invention, alarms are correlated to customer circuit identification information.

As yet a further feature of the present invention, alarms are routed to an appropriate user or users.

The above discussed features, as well as additional features and advantages of the present invention, will become more readily apparent by reference to the following detailed description and accompanying drawings.

DETAILED DESCRIPTION

The present invention provides a method of monitoring autonomous messages generated by telecommunications network elements that require the attention of maintenance personnel. A network element such as a switching network element may generate an autonomous message such as an alarm signalling that an error or malfunction has occurred. Such alarms include, for example, service affecting alarms and performance affecting alarms. Specific types of alarms include the following: a red alarm, indicating that the receiving equipment has detected a complete loss of framing pulses; a yellow alarm, indicating that the far end equipment is detecting an incoming failure; a blue alarm or alarm indication signal, which is generated when a receive signal is lost and which keeps downstream equipment functioning; an out of frame signal, indicating that the receive equipment cannot find incoming framing pulses; a bipolar violation signal, indicating a violation of the bipolar line format; a cyclic redundancy check signal, indicating an incorrect reception of data; a slip signal, indicating that a framing pulse did not appear at the exact point in time it was supposed to have appeared; and a change of frame alignment signal, indicating that equipment could not detect a framing pulse for a period of time. The preceding list is exemplary only, and is not intended to be exhaustive of the types of alarms that may be generated.

Figure 1:
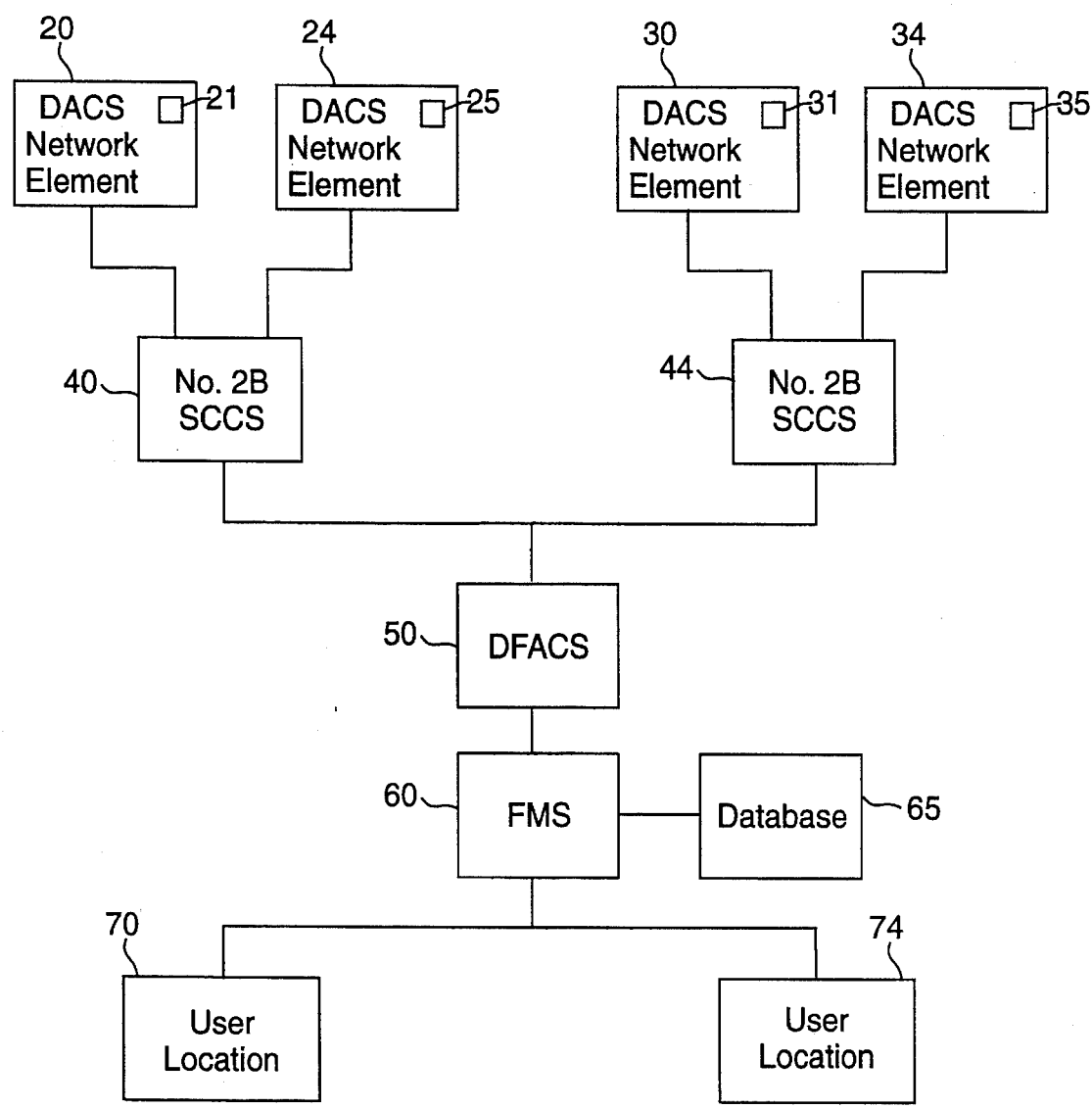
FIG. 1 is a block diagram of an alarm system according to the present invention.

The following discussion will be best understood with reference to FIG. 1, which is a block diagram of an alarm system according to the present invention. Alarm signals and other messages may be generated by a plurality of network elements such as DACS switching network elements 20, 24, 30 and 34. Although four switching network elements are shown in FIG. 1, there suitably may be a lesser or greater number of network elements as needed. The network elements 20, 24, 30, and 34 include NPCs 21, 25, 31, and 35 respectively. Although only one NPC is shown for each of the network elements 20, 24, 30, and 34, a network element will typically contain multiple NPCs with the number of NPCs determined by the application. The alarm signals and other messages generated by the plurality of switching network elements 20, 24, 30 and 34 are sent to a plurality of No. 2B Switching Control Center Systems (SCCSs) 40, 44 by known techniques. Switching Control Center Systems are described generally in a text edited by R. F. Rey, *Engineering and Operations in the Bell System* at pages 632–638 (1984), which is hereby incorporated by reference. Although two 2B SCCSs 40, 44 are shown in FIG. 1, there may be a lesser or greater number as needed. Typically, a 2B SCCS delivers output messages from DACS network elements to network technicians. The technicians can then enter input messages or commands to diagnose and undo the alarms and restore the impaired service. In the method of the present invention, the 2B SCCSs 40, 44 receive the alarms and route the alarms to a Digital Facility Access Correlation System (DFACS) 50. The DFACS 50 consists of software, such as the commercially available Unify 2000 database program produced by Unify Corporation. Both the SCCSs 40, 44 and the DFACS 50 run on the UNIX Operating System. The DFACS 50 cross-references an NPC on a DACS frame, for example the NPC 21 on the DACS frame 20, from which an alarm was generated, to a facility or carrier identifier. The alarm data is next sent to a Facility Monitoring System (FMS) 60 which is connected to an engineering database 65. The FMS 60 correlates customer circuit identification information stored in the database 65 to the facilities to which the customer is associated. The FMS 60 also runs on the UNIX Operating System. The cross-referenced and correlated alarm information is then routed to a plurality of user locations 70, 74. The user locations 70, 74 may be, for example, network management centers. Although two user locations are shown in FIG. 1, it should be understood that a lesser or greater number may exist. At a user location, for example, the user location 70, the alarm data may be read by a personal computer processor 200 running a program under Windows. In particular, the FMS 60 allows personnel at a network management center to track facility performance on selected facilities. Although there may be hundreds of thousands of facilities in a network, the FMS 60 matches the facilities with the user's request. The user can, for example, view the performance of a particular customer's network alone. The FMS 60 permits the user to disregard other facility impairments.

Figure 2:
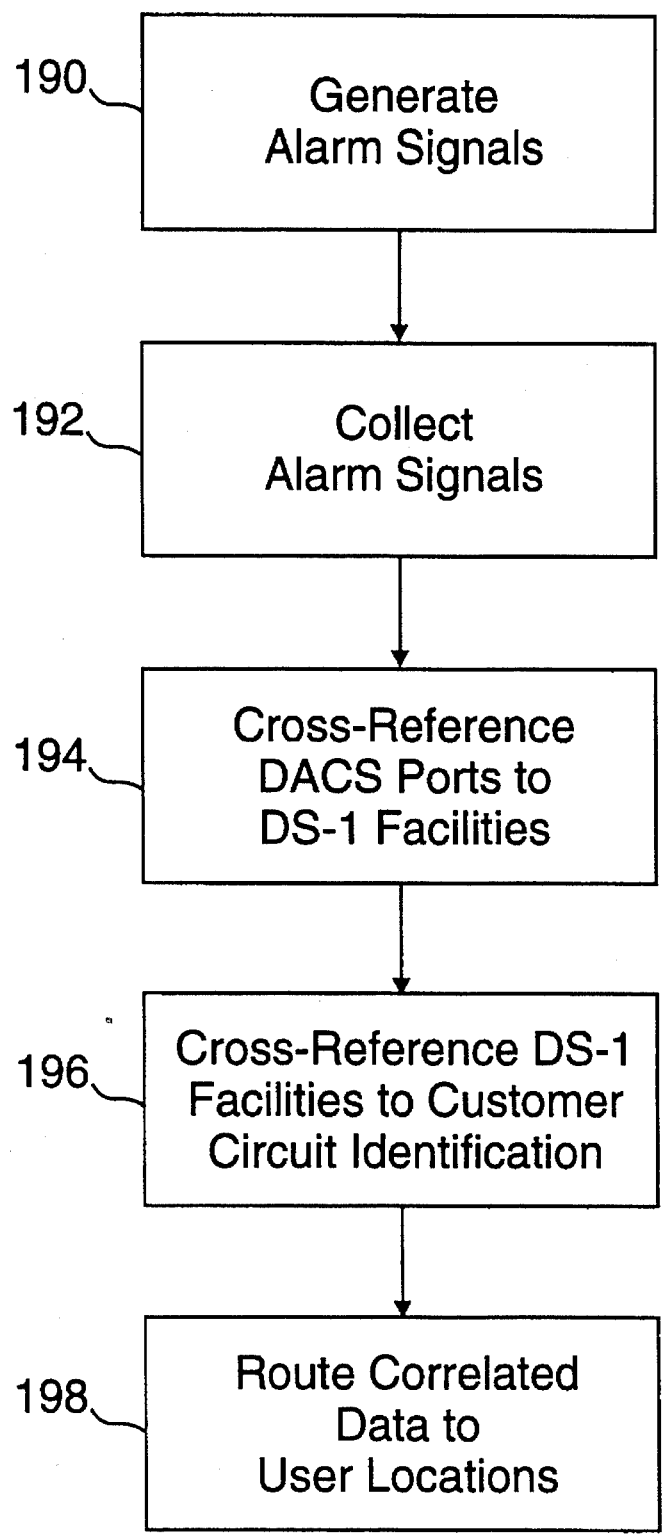
FIG. 2 is a flow chart showing the steps for processing alarm data according to the method of the present invention.

FIG. 2 is a flow chart showing the steps of processing alarm data according to the method of the present invention. In step 190, alarm signals and other autonomous messages are generated by the DACS network elements 20, 24, 30, and 34. These alarm signals and other messages are collected by the 2B SCCSs 40, 44 as shown in step 192. The SCCSs 40, 44 then route the alarm signals to the DFACS which cross-references the DACS ports or NPCs and DACS frames, from which the alarm signals were generated, to the DS-1 facilities as shown in step 194. Next, in step 196, the FMS 60 cross-references the DS-1 facilities to customer circuit identification information. Finally, the correlated information is sent to user locations 70, 74 in step 198.

Figure 3:
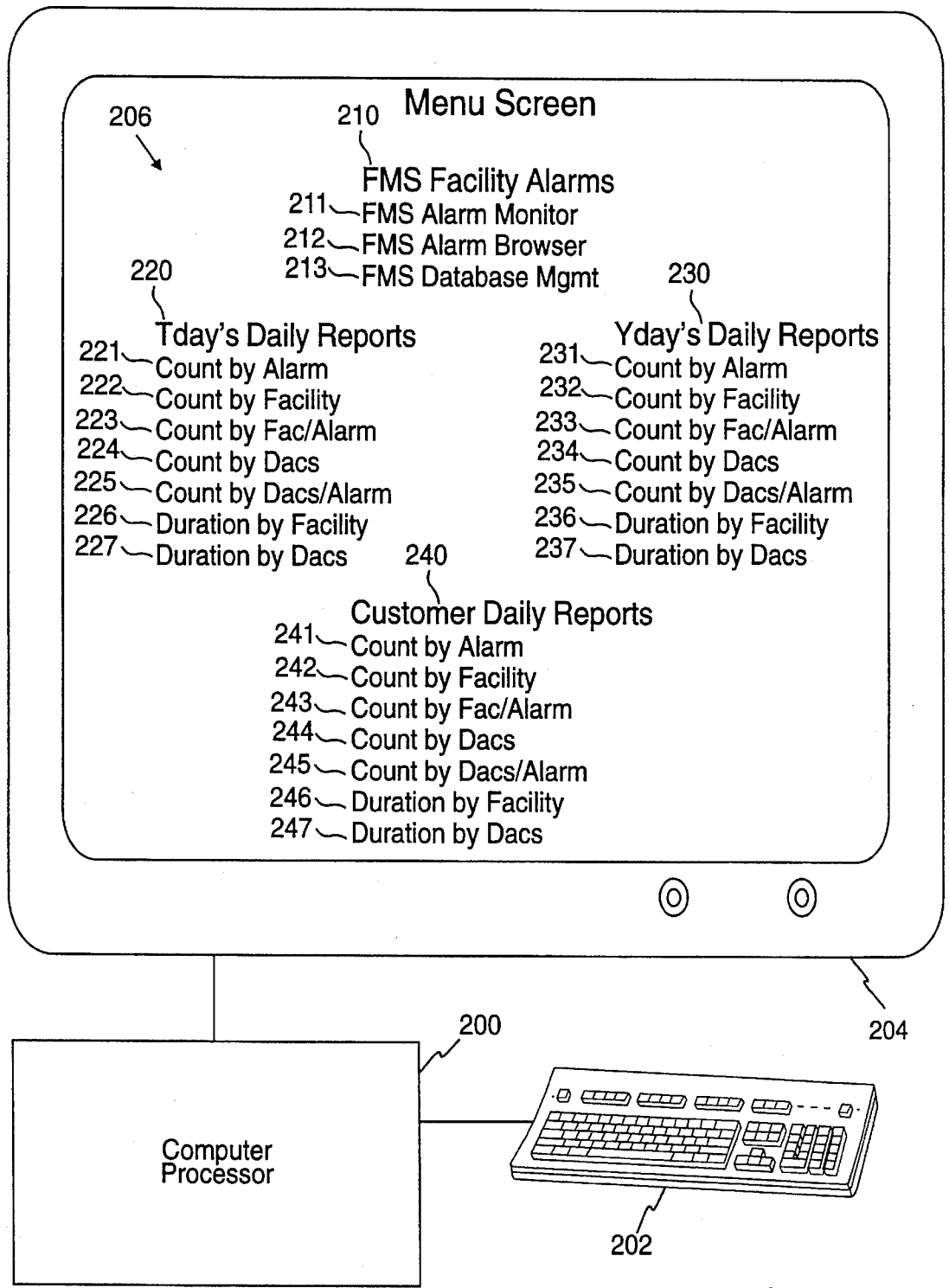
FIG. 3 is an exemplary menu of options according to the method of the present invention.

In one embodiment of the present invention, a user at the user location 70 would be presented with a menu of options 206 on a screen or monitor 204 connected to the personal computer 200 as shown in FIG. 3. The computer screen 204 would display the following headings: FMS Facility Alarms 210; Tday's Daily Reports 220; Yday's Daily Reports 230; and Customer Daily Reports 240. Under each heading, the user would see listed several options from which he could select. The user could select a desired option, for example, by pressing the tab, space, or arrow keys on a keyboard 202 connected to the personal computer 200 until the desired menu option is highlighted, and then pressing the return key.

The system is capable of keeping a user aware of customer outages in real time. The system also stores historical data to allow for proactive observation and analysis of developing problems. An "alarm browser" option 212, for example, executes a browser program which allows a user to browse the past alarm history files. The user has the ability to scroll forward and backward through time, displaying the alarms for that time frame. By using a "jump" command, the user can also jump to a particular date and time within a file. In addition, the browse program can scan the history file for any new additions if the user is currently at the end of this file.

Figure 4:
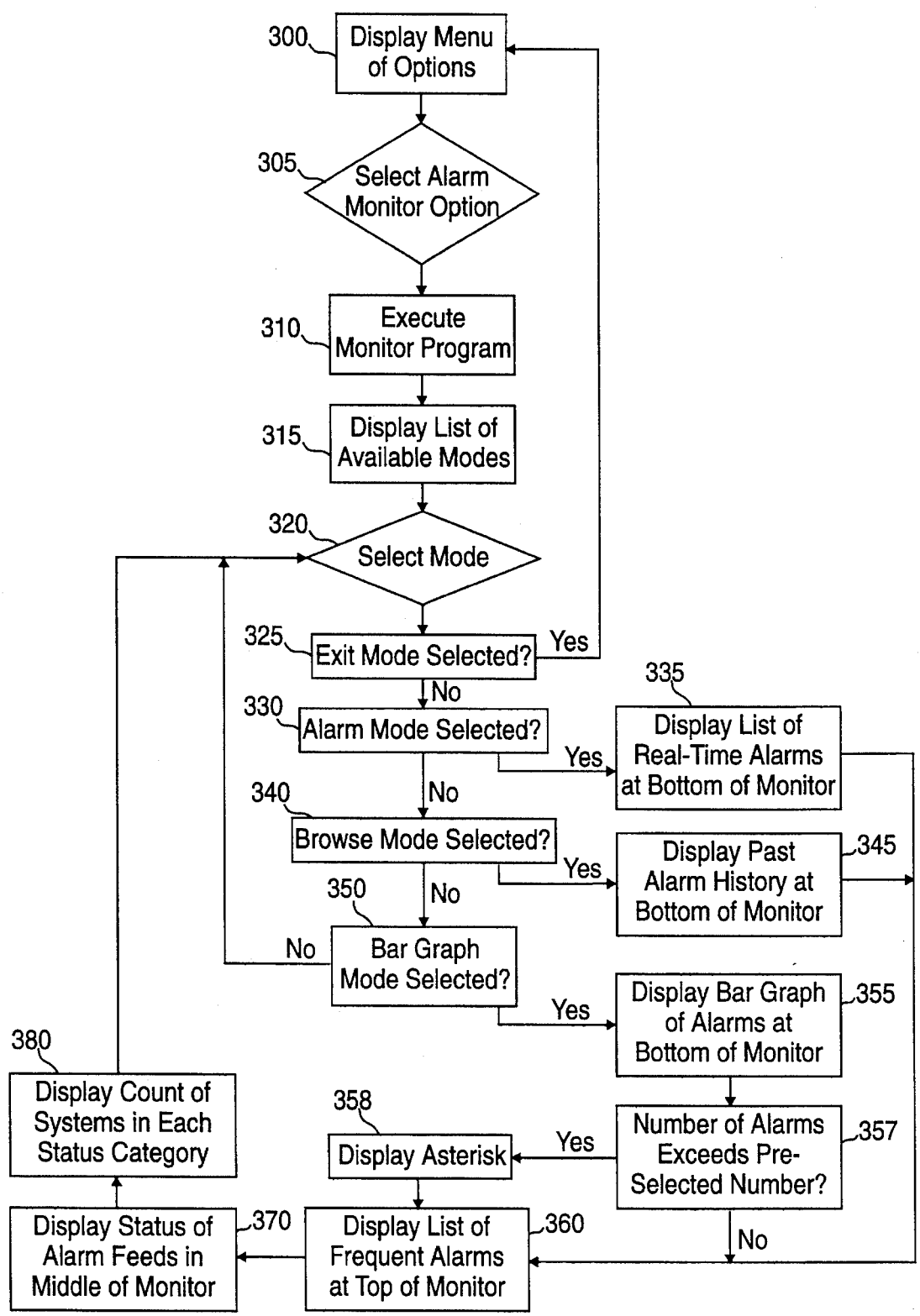
FIG. 4 is a flow chart showing steps for displaying alarm data according to one aspect of the present invention.

An "alarm monitor" option 211 executes a monitor program that allows a user to see alarms in real time. This option 211 is best understood by reference to FIG. 4 which is a flow chart showing the steps for displaying alarm data using the "alarm monitor" option. In step 300, the computer 200 displays the menu of options 206. The user next selects the "alarm monitor" option 211 in step 305. The computer 200 then executes the monitor program monitor in step 310. Several modes are available, and, in step 315, a prompt that offers the following modes would be presented to the user: an exit mode for exiting the monitor program; an alarm mode for displaying one line alarms; a bar mode for displaying a system bar graph; and a browse mode for executing the alarm browser program. In step 320, the user can switch between the various modes, for example, by pressing the arrow keys on the keyboard 202. If the user selects the exit mode in step 325, then the program returns the user to the menu of options 206. If the user selects any of the other modes, then a display of alarms will appear on the monitor 204. The display at the bottom of the screen 204 depends upon the particular mode selected. If, for example, the monitor program determines that the alarm mode was selected as shown in step 330, then real time alarms are displayed on the bottom of the screen 204 as shown in step 335. These alarms are scrolled up the screen as new alarms are displayed. This section of the screen is replaced when either the bar graph or the browse modes are active. If the monitor program determines that the browse mode was selected as shown in step 340, then the monitor program replaces the real time alarm display with a display of past alarm history files at the bottom of the screen 204. This portion of the screen would then display on the bottom of the monitor 204 data similar to the data displayed when the "alarm browser" option is selected. If the monitor program determines that the bar graph mode was selected by the user as shown in step 340, then a bar graph of the alarms for each digital central office and system appears on the bottom of the screen 204 as shown in step 355. A block is printed for each alarm type that is held in an alarm list. In step 357, the monitor program determines whether the number of alarms exceeds a pre-selected number, for example fifty-five, for an office. If the pre-selected number is exceeded, then an asterisk is displayed to indicate that alarms of that level are not all printed as shown in step 358. Also, a total count is displayed in the left hand column for each office. The last line of the display is used to display the last alarm processed. This section of the screen is also updated in real time.

At the top of the computer screen 204, a list of the most frequent alarms is displayed as shown in step 360. This portion of the screen 204 is not removed during execution of the monitor program. Finally the monitor program displays the status of alarm feeds or data links on a line separating the top and bottom sections of the screen 204 as shown in step 370. Only the first eight systems will be shown on this line. Any systems devices that are no longer sending alarms or for which no alarms were received during the previous hour, however, will be displayed. The status line also provides a count of the number of systems in each of the status categories. These categories may include, for example, red for systems that are down and no longer sending alarms; yellow for systems that are active, but that are not reporting; and green for systems that are active and receiving alarms. If the computer screen is a color monitor, then the status may be displayed in color. Once a particular display appears on the monitor 204, the user can select another mode as in step 320. When the user completes his task, he can exit the monitor program by selecting the exit mode as in steps 320 and 321. The monitor program then returns the user to the menu of options 206.

A "database mgmt" option 213 is also available and executes a database management program that allows the user to add information to the second line of the database. A second file can be created using the circuit number for the facility. This file can then be used for circuit numbers residing on the twenty-four channels or for other information determined by the user.

Several additional options are available to allow a user to view the alarms in a more focused manner. "Count by alarm" options 221, 231, 241 display the number of times each alarm has come in. Similarly, "count by facility" options 222, 232, 242 display the number of times a facility has been in alarm. Alternatively, "count by fac/alarm" options 223, 233, 243 display the number of times that a facility has been in a particular alarm. The number of times that an NPC has been in alarm can be displayed by selecting one of the "count by dacs" options 224, 234, 244. Finally, the number of times that an NPC has been in a particular alarm can be displayed by selecting one of the "count by dacs/alarm" options 225, 235, 245.

The menu 200 also provides options for displaying the duration of alarms. "Duration by facility" options 226, 236, 246 display the length of time that a facility has been in alarm. Similarly, "duration by dacs" options 227, 237, 247 display the length of time that a DACS frame and NPC have been in alarm.

Each of the count and duration options 221–227, 231–237, 241–247 is available under one of three programs. The first program is "Tday's Daily Reports" 220 which provides a count or duration display of the current day's alarms. Similarly, a second program, "Yday's Daily Reports" 230 provides a count or duration display of yesterday's alarms. When the user selects one of these options, he is provided with a prompt for a "threshold". The user then enters a one or two digit number, such as 0, on the keyboard 202 and presses the enter key. The number entered corresponds to the number of times an alarm is recorded before being displayed on the screen. The third available program is "Custom Daily Reports" 240 which provides a count or duration display of alarms occurring during a specified period of time. In addition to the "threshold" prompt, the user is provided with two additional prompts for the starting and ending dates for which he wishes alarms to be displayed. The user can select each date by typing in a two digit code for each of the year, month and day respectively, and then pressing the enter key.

The specific alarm information that appears on the user's screen will, of course, depend upon which of the menu options 211–213, 221–227, 231–237, 241–247 the user selects. The user can also set or cancel filter parameters so that, for example, only alarms from a particular facility type or office appear on the user's screen. These functions could be achieved by using appropriate commands, such as "set" and "clear" and specifying an appropriate parameter, such as a particular facility. The monitor 204 may, however, display the following types of information, among others: an identifier or code indicating the digital central office where the alarm was received; the date and time the alarm occurred; the DACS frame and NPC number on which the alarm occurred; the type of alarm; number of times an alarm has occurred; duration an alarm has been in; the facility name on which the alarm occurred; a UCR code indicating any constraints established for that facility; and a customer identifier. The preceding list is exemplary only, and other types of information may be readily displayed consistent with techniques of the present invention.

It should also be noted that since the facility history, including the number and duration of facility failures, is available, the network management centers could use the data displays for other applications as well. One such application includes providing a basis for determining customer rebate information based upon the total duration and number of facility failures during a given period.

Although this invention has been described with respect to a particular arrangement for collecting alarm signals and displaying menu options, these and other arrangements within the scope and spirit of the invention will be readily apparent to those skilled in the art. The present invention is, therefore, limited only by the appended claims.

We claim:

1. A method of monitoring a plurality of alarm signals generated by a plurality of network elements, said method comprising the steps of:

collecting said plurality of alarm signals;

cross-referencing a plurality of network processing circuits associated with said plurality of alarm signals to a plurality of DS-1 facilities;

correlating said plurality of DS-1 facilities to customer circuit identification information; and routing DS-0 alarm information, based upon the steps of cross-referencing and correlating, to at least one of a plurality of user locations.

2. The method of claim 1 further including the step of providing a user at one of said plurality of user location with a menu of options, wherein said menu of options provides said user with a plurality of options, and wherein said plurality of options permit said user to view selectively the DS-0 alarm information.

3. The method of claim 2 wherein the step of providing a menu of options comprises the step of providing at least one option for displaying said DS-0 alarm information in real time.

4. The method of claim 2 wherein the step of providing a menu of options comprises the step of providing at least one option for displaying previous DS-0 alarm information in chronological order.

5. The method of claim 2 wherein the step of providing a menu of options comprises the step of providing at least one option for displaying by alarm type the number of times said plurality of alarm signals have been generated within a preselected time period.

6. The method of claim 2 wherein the step of providing a menu of options comprises the step of providing at least one option for displaying by facility the number of times said plurality of alarm signals have been generated within a preselected time period.

7. The method of claim 2 wherein the step of providing a menu of options comprises the step of providing one option for displaying by alarm type and facility the number of times said plurality of alarm signals have been generated within a preselected time period.

8. The method of claim 2 wherein the step of providing a menu of options comprises the step of providing at least one option for displaying by network processing circuit the number of times said plurality of alarm signals have been generated within a preselected time period.

9. The method of claim 2 wherein the step of providing a menu of options comprises the step of providing at least one option for displaying by alarm type and network processing circuit the number of times said plurality of alarm signals have been generated within a preselected time period.

10. The method of claim 2 wherein the step of providing a menu of options comprises the step of providing at least one option for displaying by facility the length of time during which said plurality of DS-1 facilities have been in alarm.

11. The method of claim 2 wherein the step of providing a menu of options comprises the step of providing at least one option for displaying by network processing circuit the length of time during which said plurality of network processing circuits have been in alarm.

12. A system for monitoring a plurality of alarm signals generated by a plurality of network elements, said system comprising:

means for collecting said plurality of alarm signals;

means for cross-referencing a plurality of network processing circuits associated with said plurality of alarm signals to a plurality of DS-1 facilities;

means for correlating said plurality of DS-1 facilities to customer circuit identification information;

a plurality of user locations; and means for routing DS-0 alarm information, based upon functions performed in said means for cross-referencing and said means for correlating, to at least one of said plurality of user locations.

13. The system of claim 12 further comprising means for providing a user, at the at least one of said plurality of user locations, a menu of options, wherein said menu of options provides said user with a plurality of options, and wherein said plurality of options permit said user to view selectively the DS-0 alarm information.

14. The system of claim 13 wherein said means for providing a menu of options includes means for providing an option for displaying said DS-0 alarm information in real time.

15. The system of claim 13 wherein said means for providing a menu of options includes means for providing at least one option for displaying previous DS-0 alarm information in chronological order.

16. The system of claim 13 wherein said means for providing a menu of options includes means for providing at least one option for displaying by alarm type the number of times said plurality of alarm signals have been generated within a preselected time period.

17. The system of claim 13 wherein said means for providing a menu of options includes means for providing at least one option for displaying by facility the number of times said plurality of alarm signals have been generated within a preselected time period.

18. The system of claim 13 wherein said means for providing a menu of options includes means for providing at least one option for displaying by alarm type and facility the number of times said plurality of alarm signals have been generated within a preselected time period.

19. The system of claim 13 wherein said means for providing a menu of options includes means for providing at least one option for displaying by network processing circuit the number of times said plurality of alarm signals have been generated within a preselected time period.

20. The system of claim 13 wherein said means for providing a menu of options includes means for providing at least one option for displaying by alarm type and network processing circuit the number of times said plurality of alarm signals have been generated within a preselected time period.

21. The system of claim 13 wherein said means for providing a menu of options includes means for providing at least one option for displaying by facility the length of time during which said plurality of DS-1 facilities have been in alarm.

22. The system of claim 13 wherein said means for providing a menu of options includes means for providing at least one option for displaying by network processing circuit the length of time during which said network processing circuits have been in alarm.

23. A system for monitoring a plurality of alarm signals generated by a plurality of network elements, said system comprising:

a plurality of switching control center systems for receiving the plurality of alarm signals;

a digital facility access correlation system connected to the plurality of switching control center systems for receiving information pertaining to the plurality of alarm signals and for cross-referencing a plurality of network processing circuits associated with the plurality of alarm signals to a plurality of DS-1 facilities;

a facility monitoring system connected to the digital access correlation system for receiving data pertaining to the plurality of alarm signals and for correlating the plurality of DS-1 facilities to customer circuit identification information; and a plurality of user locations for receiving cross-referenced and correlated DS-0 alarm information and for providing a menu of options allowing a user to view selectively the cross-referenced and correlated DS-0 alarm information.

24. The system of claim 23 wherein the plurality of user locations allow a user to view the cross-referenced and correlated DS-0 alarm information in real time.

* * * * *